No. 641,048. Patented Jan. 9, 1900.
P. T. SIEVERT.
APPARATUS FOR MANUFACTURING HOLLOW GLASS ARTICLES.
(Application filed July 1, 1899.)
(No Model.)
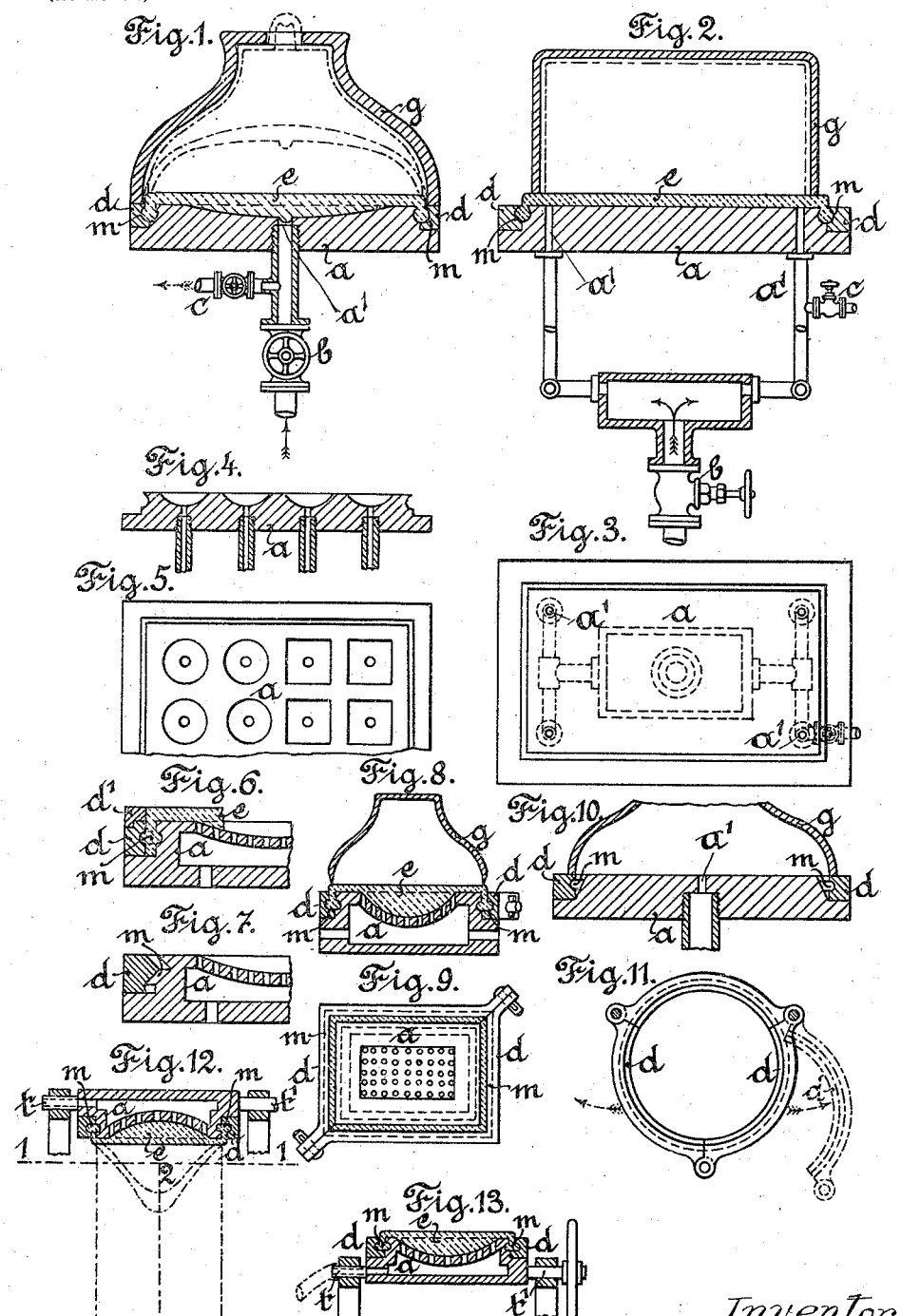
Witnesses:
Edward Piefer.
George Barry Jr.
Inventor:
Paul Theodor Sievert
by attorneys
Brown & Seward

UNITED STATES PATENT OFFICE.

PAUL THEODOR SIEVERT, OF DRESDEN, GERMANY.

APPARATUS FOR MANUFACTURING HOLLOW GLASS ARTICLES.

SPECIFICATION forming part of Letters Patent No. 641,048, dated January 9, 1900.

Application filed July 1, 1899. Serial No. 722,501. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Apparatus for the Manufacture of Hollow Glass Articles, of which the following is a specification.

This improvement relates to apparatus employed for performing a process invented by me for manufacturing hollow glass bodies, which consists in the spreading out of a mass of molten or plastic glass into a layer and the blowing out of that layer by an elastic pressure medium to the form of the hollow article or articles desired.

An apparatus embodying the present invention consists principally of a solid or hollow plate or slab having a flat or recessed surface and in which are one or more perforations and upon which the molten glass is to be placed as a plastic layer and a separate frame surrounding said plate for the purpose of confining thereto the edges of the said layer while the latter is blown out by the elastic pressure medium introduced through the perforation or perforations in the plate. The said plate may either be stationary or mounted on trunnions to provide for its being turned over. The said frame may be made of one piece or of two or more pieces to provide for its easy removal from the solidified hollow glass body and for the removal of said body from the plate. The said plate may be made with a groove or channel in its edge to receive the molten glass at the edge of the plastic layer for the purpose of holding the said layer while it is blown out, and the said frame may have a groove or channel for the same purpose.

In the accompanying drawings, Figure 1 represents a vertical section of one example of an apparatus embodying this invention; Fig. 2, a vertical section of another example, and Fig. 3 a plan of the plate corresponding with Fig. 2; Fig. 4, a vertical section, and Fig. 5 a plan in part of the plate with several dish-shaped recesses in its face. Figs. 6, 7, 8, and 10 represent in vertical section different examples of the plate and the frame, and Fig. 9 a plan corresponding with Fig. 8. Fig. 11 shows a frame in plan. Figs. 12 and 13 show in vertical section in two different positions the plate provided with trunnions.

Similar letters of reference designate corresponding parts in all the figures.

Fig. 1 shows a single perforation $a'$ in the center of the plate $a$, while Fig. 2 shows a perforation $a'$ in each corner of the plate. (See also the plan view Fig. 3.) The pressure medium admitted lifts in both cases the plastic-glass layer $e$ uniformly and blows it up. $b$ is the inlet-valve, and $c$ the outlet-valve, for the pressure medium.

In Fig. 1 the pressure is directed against the center of a plastic-glass layer $e$, spread out on the solid plate $a$, with a "dished" upper surface, while in Fig. 2 this upper surface is flat. In both figures it is shown that the plate is surrounded by a frame $d$, which, in combination with the plate $a$, forms a furrow, channel, or groove $m$, into which when spread out the liquid glass enters and which forms the support or hold for the glass layer when raised by the pressure. The frame $d$, as seen in Figs. 1, 2, 6, 7, 8, 9, and 10, may have various internal profiles, among which those shown at Figs. 7 and 10 are especially preferable, because they most readily admit of the separation of the holding or supporting glass rim or edge formed when the frame, as shown in Fig. 11 in plan view, is made to open out, as is necessary to admit of the removal of the article. Fig. 6 shows in addition a second frame $d'$, capable of opening, applied to the surrounding frame $d$, by which the height of the glass layer when being spread out is regulated.

The profile of the frame shown in Fig. 7, by means of its sharp edge at the upper opening of the furrow, has the effect of imparting the particular thickness of wall to the glass object which it is desired that it shall possess when the plastic-glass sheet is blown up, while in case of a furrow whose mouth has vertical walls the glass has a tendency at the present time to raise itself in greater thickness at its lower edge. The mold shown in Fig. 7 with the sharp hot edge compels the glass to rise immediately in quite a thin wall.

In Figs. 2 and 8 the molds $g$ are shown as resting upon the glass mass, and in Figs. 1 and 10 upon the frame surrounding the edge of the glass mass.

In Figs. 4 and 5 the plate $a$ is shown with a plurality of depressions in its upper surface when it is desired to produce a number of hollow glass articles from a single sheet of plastic glass. Each depression has therefore its own pressure-medium admission opening or openings in the plate $a$.

Fig. 12 shows a hollow plate furnished with trunnions $t\,t'$, supported in bearings $t^2$, to enable the plate to be turned over and invert the position of the plastic glass. This will allow of the formation and shape of the hollow glass body as by the inverted and to-and-fro swung glass-blower's tube.

The action of this apparatus will be better understood by reference to Fig. 13, in which the plate is shown in the initial position to receive the plastic glass $e$, which is held firmly in place by the furrow between plate $a$ and frame $d$. The trunnion $t$, which is hollow, has a hose-pipe (not shown) connected with it for leading the pressure medium to the under side of the glass, and a winch-handle is connected to the trunnion $t'$ to facilitate the turning over of the plate. When the plate is turned over, as in Fig. 12, the glass layer $e$ will by its own weight begin to bulge, and blowing being immediately commenced a cylindrical figure with a closed end, as shown by dotted outline, may be formed, such cylinder having an equal thickness of wall throughout its length. For the conversion of this cylinder into a sheet it is only necessary to sever it at the cross-lines 1 1 and longitudinally at the line 2 2, when by the application of heat the cylinder will open and form a flat plate of glass.

What I claim as my invention is—

1. The combination of a plate adapted to receive upon its upper surface a layer of plastic glass and perforated for the upward passage through it of an elastic pressure medium, and a frame which surrounds said plate and between which and the said plate there is provided a channel for the reception and retention of the edges of the layer of plastic glass spread upon said plate and which is supported on said plate but capable of opening outward therefrom, substantially as herein described.

2. The combination of a plate in which are one or more perforations for the passage through it of an elastic pressure medium and in the face of which are one or more dished recesses, and a frame surrounding said plate for confining thereto the edges of a layer of plastic glass spread upon said plate, substantially as herein described.

3. The combination of a hollow plate in the face of which are one or more perforations for the passage through it of an elastic pressure medium and which is provided with trunnions, means for securing to said plate the edges of a layer of plastic glass spread upon said plate, and bearings for said trunnions in which said plate is capable of being turned over, substantially as herein described.

4. The combination of a hollow plate in the face of which are one or more perforations for the passage through it of an elastic pressure medium and which is provided with trunnions one of which is hollow for the entrance of said pressure medium into the cavity in said plate, means for securing to said plate the edges of a layer of plastic glass spread upon said plate, and bearings for said trunnions in which said plate is capable of being turned over, substantially as herein described.

In testimony that I claim the foregoing as my invention I have signed my name, in presence of two witnesses, this 15th day of June, 1899.

PAUL THEODOR SIEVERT.

Witnesses:
PAUL ARRAS,
WILHELM WIESENHÜTTER.